United States Patent
Shimamura et al.

(10) Patent No.: US 7,402,245 B2
(45) Date of Patent: Jul. 22, 2008

(54) DIGESTED SLUDGE TREATMENT APPARATUS

(75) Inventors: Kazuaki Shimamura, Tokyo (JP); Takao Hagino, Tokyo (JP); Noriko Ueda, Tokyo (JP)

(73) Assignee: Ebara Corporation, Tokyo (JP)

( * ) Notice: Subject to any disclaimer, the term of this patent is extended or adjusted under 35 U.S.C. 154(b) by 372 days.

(21) Appl. No.: 11/334,387

(22) Filed: Jan. 19, 2006

(65) Prior Publication Data
US 2006/0163134 A1 Jul. 27, 2006

(30) Foreign Application Priority Data
Jan. 21, 2005 (JP) ............................. 2005-013551
Jan. 21, 2005 (JP) ............................. 2005-013552

(51) Int. Cl.
*C02F 3/00* (2006.01)
(52) U.S. Cl. ...................................... 210/252; 210/295
(58) Field of Classification Search ................. 210/252, 210/295
See application file for complete search history.

(56) References Cited

FOREIGN PATENT DOCUMENTS

JP 63084696 A * 4/1988

* cited by examiner

*Primary Examiner*—Chester T. Barry
(74) *Attorney, Agent, or Firm*—Wenderoth, Lind & Ponack, L.L.P.

(57) ABSTRACT

A first aspect of the present invention relates to a digested sludge treatment apparatus for treating digested sludge generated by subjecting organic waste matter to anaerobic digestion, comprising: an apparatus for decarbonating the digested sludge; a removal apparatus for removing coarse contaminant particles from the digested sludge; and an apparatus for separating or concentrating crystals containing magnesium ammonium phosphate from the digested sludge after the digested sludge passes through the decarbonation apparatus and removal apparatus. Another aspect of the present invention relates to a digested sludge treatment apparatus for treating digested sludge generated by subjecting organic waste matter to anaerobic digestion, comprising: a crystallization reactor for precipitating magnesium ammonium phosphate from the digested sludge; a removal apparatus for removing coarse contaminant particles from the digested sludge; and an apparatus for separating or concentrating crystals containing magnesium ammonium phosphate from the digested sludge after the digested sludge passes through the crystallization reactor and coarse contaminant particles removal apparatus.

2 Claims, 3 Drawing Sheets

DIGESTED SLUDGE TREATMENT APPARATUS

BACKGROUND OF THE INVENTION

The present invention relates to an apparatus for treating digested sludge generated when organic waste matter is subjected to anaerobic digestion.

In another aspect, the present invention relates to a method and an apparatus for preventing scale precipitation, particularly MAP scale precipitation, on the inside of a pipe when digested sludge generated by subjecting sludge to anaerobic digestion is transported by the pipe.

In a further aspect, the present invention relates to digested sludge treatment, and more particularly to a treatment method and a treatment apparatus with which phosphorus can be recovered efficiently from digested sludge generated by subjecting sludge to anaerobic digestion.

In a treatment facility for treating organic waste water containing phosphorus and nitrogen, such as sewerage, waste water, and night soil, first the raw sludge (also referred to as primary sludge hereafter) is subjected to solid-liquid separation in a primary sedimentation tank, whereupon the separated supernatant liquid undergoes an activated sludge process to remove organic matter. The activated sludge produced in the activated sludge process is discharged as excess sludge. When raw sludge, excess sludge, or organic waste matter such as night soil or raw refuse is subjected to anaerobic digestion, the organic matter in the waste matter is broken down by the action of acidic bacteria and methanogenic bacteria, leading to a reduction in the amount of sludge, and waste water having high concentrations of methane gas, carbon dioxide, nitrogen, and phosphorus is generated. Today, active investigations are being conducted into methods of utilizing the generated methane gas as a heat source, producing MAP (magnesium ammonium phosphate) from the digested sludge liquor obtained by dewatering the digested sludge, and making effective use of this MAP in fertilizers, chemical raw materials, and so on (Japanese Unexamined Patent Application Publication 2003-117306).

Moreover, anaerobic digestion tanks have recently increased in efficiency in order to save energy and reduce sludge. For example, sludge is solubilized by subjecting raw sludge, excess sludge, or mixed sludge containing both raw sludge and excess sludge to physical/mechanical treatment, chemical liquefaction treatment, heat treatment, and so on, thereby enabling an improvement in the methane gas recovery rate of the subsequent anaerobic digestion process and promoting sludge reduction. Ultrasonic treatment, crushing using a mill, and so on may be cited as examples of such physical/mechanical treatment, while treatment with ozone, hydrogen peroxide, acid, or alkali is included in the chemical liquefaction treatment. Heat treatment includes treatment with thermophilic bacteria and so on Japanese Unexamined Patent Application Publication 2002-336898, for example, discloses a method of solubilizing sludge by treating the sludge in an ultrasonic treatment process.

Nowadays, in order to achieve effective utilization and efficient treatment of digested sludge, regions exist in which all wastewater treatment plants and the like are connected by sewers, and generated digested sludge is transported through the sewers to be treated collectively in a single treatment plant. The construction cost of the sewers is cheaper than that of a treatment facility, and since the advantage of scale applies to sludge treatment facilities (i.e. the unit cost thereof decreases as the scale increases), sewers are considered to be more economical in locations such as urban areas, where residential buildings are in close proximity.

When digested sludge is transported by pipes, so-called MAP precipitate, generated when the magnesium ions of the sludge combine with phosphorus ions and ammonium ions, is generated, leading to possible blockages of the sludge pipe.

To solve this problem, a method of transporting the sludge through a sludge pipe after removing and recovering the MAP by aerating the sludge in a reactor in advance to generate MAP particles, and then subjecting the sludge containing the MAP particles to centrifugal separation, is known.

Furthermore, as the efficiency of anaerobic digestion improves, the nitrogen and phosphorus concentrations of the generated waste water increase. Organic waste matter initially contains elements such as nitrogen, phosphorus, and magnesium, and when the organic waste matter is solubilized, these elements migrate to the liquid. When waste water containing high concentrations of nitrogen and phosphorus is returned to a water treatment system, increased nitrogen and phosphorus loads are applied to the water treatment system, causing a deterioration in the quality of the treated water.

In a known technique for solving this problem, digested sludge or digested sludge liquor is subjected to aeration treatment to generate MAP, and a part of the sludge that is submerged in a sedimentation tank is returned to the aeration tank top serve as seed crystals. In so doing, the phosphorus concentration of the return water decreases, and. MAP recovery is facilitated. In Japanese Examined Patent Application Publication H7-115979, digested sludge is decarbonated, whereupon a magnesium compound is added to precipitate MAP, thereby reducing the phosphorus concentration of liquid. In both cases, the phosphorus concentration of the liquid is decreased by precipitating MAP, and therefore phosphorus can be prevented from circulating endlessly during water treatment and sludge treatment processes.

A method of transporting the sludge through a sludge pipe after removing and recovering MAP by aerating the digested sludge in a reactor in advance to generate MAP particles, and then subjecting the sludge containing the MAP particles to centrifugal separation, is also known. By means of this operation, problems such as blockages of the sludge pipe caused by the MAP particles can be avoided.

As noted above, the nitrogen and phosphorus concentrations of generated waste water increase as the efficiency of anaerobic digestion improves. Organic waste matter initially contains elements such as nitrogen, phosphorus, and magnesium, and when the organic matter is solubilized, these elements migrate into the solution. Nitrogen, phosphorus, and magnesium are constituent components of MAP, and at high concentrations, or when alkali increases, the nitrogen, phosphorus, and magnesium easily equal or exceed the solubility product of the MAP such that the MAP precipitates spontaneously in a digestion tank. When the MAP precipitates onto a draft tube in the digestion tank, the flow of the digested sludge deteriorates, and scale trouble such as blockages during pump extraction occur frequently.

Moreover, the MAP is disposed of together with the dewatered sludge rather than being recovered, and hence there is demand for an efficient MAP recovery method.

When MAP is precipitated by decarbonating the digested sludge or adding a magnesium compound thereto, the phosphorus concentration of the dewatered separated liquid decreases, and therefore the phosphorus load on the water treatment system is reduced so that the treated water can be maintained at a favorable quality. However, this method focuses on phosphorus removal rather than the recovery of phosphorus resources, and hence there is demand for a treatment method which satisfies aspects of both phosphorus removal and phosphorus recovery. Moreover, when MAP is recovered through aeration and centrifugal separation, the recovered substance contains digested sludge and coarse contaminant particles such as night soil residue as well as the MAP, and hence it is not always possible to recover MAP having a high degree of purity. When recycling phosphorus, purity is required, and hence there is demand for a method of recovering MAP having a high degree of purity.

Further, when digested sludge containing MAP is transported by pipe to a facility for treating sludge collectively, a large amount of MAP scale is generated in the pipe, leading to a deterioration in the efficiency with which the sludge is transported. Following its initial generation, MAP scale continues to grow. If MAP scale is left on the inside of the pipe, the entire sewer is eventually covered in MAP scale, making sludge transportation difficult, and as a result, cleaning must be performed periodically and maintenance becomes troublesome.

Furthermore, when MAP is removed and recovered by aerating digested sludge in a reactor in advance to generate MAP particles and then subjecting the sludge containing the MAP particles to centrifugal separation in an attempt to solve the problems described above, coarse contaminant particles such as night soil residue in the digested sludge often cause blockages in the centrifugal separator, particularly when a liquid cyclone is used as the centrifugal separator. As a result, stable treatment is difficult, while cleaning and maintenance are laborious.

SUMMARY OF THE INVENTION

An object of the present invention is to solve the problems described above by providing a method and an apparatus for stably preventing scale, particularly MAP scale, from forming on the inside of a pipe during the transportation of digested sludge, and/or providing a digested sludge treatment method and a digested sludge treatment apparatus which satisfy aspects of both phosphorus removal and phosphorus recovery, and enable the recovery of MAP having a high degree of purity.

To achieve the objects described above, a first aspect of the present invention provides a digested sludge treatment apparatus for treating digested sludge generated by subjecting organic waste matter to anaerobic digestion, comprising: an apparatus for decarbonating the digested sludge; a removal apparatus for removing coarse contaminant particles from the digested sludge; and an apparatus for separating or concentrating crystals containing magnesium ammonium phosphate from the digested sludge after the digested sludge passes through the decarbonation apparatus and removal apparatus.

Another aspect of the present invention provides a digested sludge treatment apparatus for treating digested sludge generated by subjecting organic waste matter to anaerobic digestion, comprising: a crystallization reactor for precipitating magnesium ammonium phosphate from the digested sludge; a removal apparatus for removing coarse contaminant particles from the digested sludge; and an apparatus for separating or concentrating crystals containing magnesium ammonium phosphate from the digested sludge after the digested sludge passes through the crystallization reactor and coarse contaminant particles removal apparatus.

A further aspect of the present invention provides a method of preventing scale from forming on the inside of a pipe when digested sludge generated by subjecting organic waste matter to anaerobic digestion is transported by the pipe, wherein the digested sludge is treated in a decarbonation process and a coarse contaminant particles removal process, micro-particles containing MAP are separated from the digested sludge following decarbonation and coarse contaminant particles removal, and following removal of these micro-particles, the digested sludge is transported by the pipe.

In this method of the present invention, the digested sludge is preferably subjected to processing to lower the pH and/or processing to reduce at least one of the magnesium ion concentration, phosphate ion concentration, and ammonium ion concentration following micro-particle removal, and then transported by the pipe. The anaerobic digestion may be performed following a discharge process for discharging phosphate ions from the organic waste matter and a concentration process for concentrating the organic waste matter following the discharge process. Further, the digested sludge that is transported by the pipe should have a magnesium ion concentration of no more than 20 mg/L, and preferably no more than 5 mg/L.

A further aspect of the present invention provides an apparatus for preventing scale from forming on the inside of a pipe when digested sludge generated by treating organic waste matter in an anaerobic digestion tank is transported by the pipe, comprising: an apparatus for decarbonating the digested sludge; a removal apparatus for removing coarse contaminant particles from the digested sludge; and an apparatus for separating micro-particles containing MAP from the digested sludge after the digested sludge passes through the decarbonation apparatus and coarse contaminant particles removal apparatus.

This apparatus of the present invention preferably further comprises a chemical adding apparatus for lowering the pH of the digested sludge following micro-particle removal, and/or a chemical adding apparatus for reducing at least one of the magnesium ton concentration, phosphate ion concentration, and ammonium ion concentration thereof. Further, discharging means for discharging phosphate ions from the organic waste matter and a concentration apparatus for concentrating the organic waste matter following the discharge process may be disposed before the anaerobic digestion tank.

A further aspect of the present invention provides a digested sludge treatment method for treating digested sludge generated by subjecting organic waste matter to anaerobic digestion, wherein the digested sludge is treated in a crystallization process for precipitating MAP by adding a magnesium compound and coarse contaminant particles such as night soil residue removal process for removing coarse contaminant particles from the digested sludge, micro-particles containing MAP are recovered from the digested sludge in a separation process following the crystallization process and coarse contaminant particles removal process, and following removal of these micro-particles, the digested sludge is dewatered in a dewatering process. In this method of the present invention, the MAP-containing micro-particles recovered in the separation process, or a portion or all of MAP-containing effluent generated in the separation process, may be returned to the crystallization process, while a portion or all of the coarse contaminant particles removed in the coarse contaminant particles removal process may be supplied to the dewatering process. Further, following micro-particle removal, the digested sludge is preferably subjected to processing to lower the pH and/or processing to reduce at least one of the magnesium ion concentration, phosphate ion concentration, and ammonium ion concentration, and then transported to the dewatering process.

A further aspect of the present invention provides a digested sludge treatment apparatus for treating digested sludge generated by subjecting organic waste matter to anaerobic digestion, comprising: a crystallization apparatus having adding means for adding a magnesium compound in order to precipitate MAP during treatment of the digested sludge; a coarse contaminant particles removal apparatus for removing coarse contaminant particles from the digested sludge: a separation apparatus for recovering micro-particles containing MAP from the digested sludge after the digested sludge passes through the crystallization apparatus and coarse contaminant particles removal apparatus; and a dewatering apparatus for dewatering the digested sludge following removal of the micro-particles. In this apparatus of the present invention, a return path may be provided for returning a portion or all of the MAP-containing micro-particles recovered by the separation apparatus to the crystallization apparatus, and supply means may be provided for supplying a portion or all of the coarse contaminant particles removed by the coarse contaminant particles removal apparatus to the dewatering apparatus. Further, a chemical adding apparatus for lowering the pH of the digested sludge following micro-particle removal, and/or a chemical adding apparatus for reducing at least one of the magnesium ion concentration, phosphate ion concentration, and ammonium ion concentration thereof, may be provided after the separation apparatus.

According to the present invention, by employing the constitution described above, MAP scale on the inside of a pipe for transporting digested sludge can be reduced greatly, and/or phosphorus can be recovered efficiently from the inside of a digestion tank.

Figure 1:
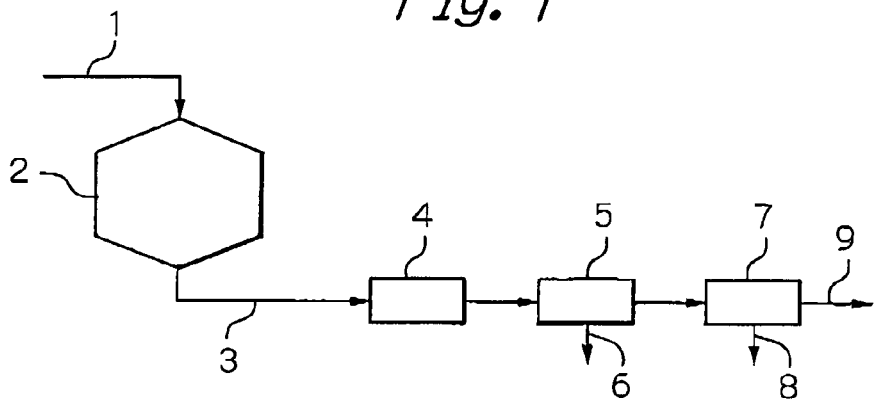
FIG. 1 is a flow diagram showing an example of the flow of digested sludge treatment according to the present invention.

The various reference numerals in the drawings denote the following components.
1: introduced sludge
2: anaerobic digestion tank
3: digested sludge (extracted sludge)
4: decarbonation process
5: coarse contaminant particles removal process
6: coarse contaminant particles
7: process for separating micro-particles containing MAP
8: recovery of micro-particles containing MAP
9: out of the system
10: pH adjustor
11: concentrated excess sludge
12: phosphorus discharge tank
13: BOD source
14: concentration process
15: separated water
16: dewatering process
17: concentration-adjusted water
18: sludge liquor
101: introduced sludge
102: anaerobic digestion tank
103: extracted sludge (digested sludge)
104: crystallization process
105: Mg compound
106: coarse contaminant particles removal process
107: coarse contaminant particles
108: process for separating micro-particles containing MAP
109: recovery of micro-particles containing MAP
110: dewatering process
111: sludge liquor
112: out of the system
113: micro-particle transportation pipe
114: coarse contaminant particles transportation pipe

DETAILED DESCRIPTION OF THE INVENTION

Embodiments of the present invention will now be described in detail with reference to the drawings.

Note that in the drawings, constitutional elements having identical functions have been allocated identical reference numerals.

Examples of organic waste matter treated in the present invention include night soil, treatment tank sludge, sewerage sludge, agricultural sludge, livestock waste, raw refuse, and food waste. The organic waste matter is typically in liquid slurry form, or has a high moisture content when in solid form. To enable smooth treatment, it is preferable to introduce non-slurry form waste matter into waste water or the like such that the waste matter is treated in slurry form. In the following, an example in which sewerage sludge is used as the organic waste matter will be described.

FIG. 1 is a flow diagram showing an example of a treatment flow according to the present invention, which is constituted by an anaerobic digestion tank 2, a decarbonation process 4 for decarbonating digested sludge, a coarse contaminant particles separation process 5, and a micro-particle separation process 7 for separating and recovering micro-particles containing MAP.

Excess sludge and/or primary sludge are introduced into the anaerobic digestion tank 2. The interior of the anaerobic digestion tank is heated and maintained at a temperature of approximately 55° C. or approximately 35° C. In the anaerobic digestion tank, the sludge is broken down into methane, carbon dioxide, a gas such as hydrogen sulfide, water-soluble nitrogen, phosphorus, and so on by the action of acid-fermentative bacteria and methanogenic bacteria. The generated methane gas may be recovered and used as energy. The amount of generated methane gas is increased by introducing easily decomposable raw sludge in addition to excess sludge. As the sludge decomposes, phosphorus, magnesium, and ammonium migrate to the liquid side, and thus MAP is generated spontaneously in the anaerobic digestion tank. As a result of this MAP precipitation, scale trouble occurs on the draft tube, the base portion of the anaerobic digestion tank, the sludge discharge pipe, and so on.

The ratio of the phosphorus, magnesium, and ammonium in the digested sludge is generally phosphorus magnesium: ammonium=100 to 500: several to several tens: 1000, and hence the magnesium concentration is overwhelmingly lower than the phosphorus and ammonium concentrations During MAP generation in the digestion tank, the magnesium concentration clearly serves as a rate control.

The digested sludge contains micro-particles containing MAP, and has a pH in the vicinity of 7, a phosphorus concentration between 100 and 500 mg/L, a magnesium concentration between several and several tens of mg/L, and an ammonium concentration between 500 and 4000 mg/L. Conventionally, a large amount of MAP scale is generated in a sewer when digested sludge having these properties is transported by pipe, leading to problems such, as blockages.

As a result of committed research into the phenomenon of scale generation, performed by the present inventors and others, it was ascertained that pH variation and gas phase intermixing inside the pipe leads to decarbonation, causing the generation of MAP and hence scaling. In other words, the digested sludge continues to possess a latent ability to generate MAP (MAP generation ability hereafter). To make matters worse, the MAP micro-particles generated spontaneously in the digested sludge act as seed crystals, promoting scale generation.

The present inventors focused on the remnant MAP generation ability described above, and thus discovered a need to reduce the remnant MAP generation ability before the digested sludge is introduced into a sewer. The present inventors discovered that the MAP generation ability of digested sludge is greatly reduced by decarbonating the digested sludge to raise the pH such that MAP is generated in advance, and then separating the MAP contained in the digested sludge and the MAP generated in the decarbonation process from the digested sludge, as in the present invention.

Aeration treatment or decompression treatment may be employed in the decarbonation process 4. Aeration treatment involves aerating the digested sludge such that the carbon gas in the sludge is dispersed into the gas phase, thereby raising the pH such that MAP is generated in a quantity corresponding to the amount of remaining magnesium. In decompression treatment, a degassing apparatus (referred to as a thin film vacuum degassing apparatus hereafter) such as that disclosed in Japanese Unexamined Patent Application Publication H7-136406 is preferably used. Specifically, a subject liquid is increased in speed by the centrifugal force of a sifting body which has a base and is rotated in a vacuum container, whereby the subject liquid collides with the inner wall surface of the vacuum container such that the gas in the subject liquid is removed. As a result of the decompression treatment, decarbonation occurs, leading to an increase in the pH and the generation of MAP.

In the treatment described above, if the magnesium ion concentration of the liquid decreases, the MAP generation ability disappears, and hence scale generation is suppressed. For example, if the pH is raised from 7 to 8, the magnesium ion concentration of the digested sludge generally falls to $1/10$ to $1/2$. In the present invention, the magnesium ion concentration of the digested sludge is set at no more than 20 mg/L, and preferably no more than 5 mg/L. When the magnesium ion concentration is no more than 20 mg/L, almost no MAP supersaturation occurs even when the pH in the sewer varies, or when the gas phase is intermixed such that the pH rises, for example, and hence MAP precipitation can be prevented.

Decarbonation through chemical addition may be employed as a decarbonation method instead of aeration and decompression. Needless to say, these operations may be combined and performed in any order. The decarbonated digested sludge is then introduced into the coarse contaminant particles removal process 5. Conventionally, no coarse contaminant particles separation process is performed, and therefore when a liquid cyclone is used in the subsequent micro-particle separation process 7, blockages caused by coarse contaminant particles and the like occur. For this reason, there is demand for a treatment method exhibiting long-term stability. In the present invention, coarse contaminant particles are removed, enabling a vast improvement in the stability of the subsequent micro-particle separation process 7, particularly when this process employs a liquid cyclone.

The removed coarse contaminant particles 6 may be discharged outside of the system or mixed into the digested sludge following the micro-particle separation process 7. When a dewatering process is provided, the coarse contaminant particles 6 may be introduced in the dewatering process. In this case, the dewatering performance is enhanced, and it is therefore preferable to introduce the coarse contaminant particles 6 into the dewatering process if such a process is provided.

Note that the decarbonation process 4 and coarse contaminant particles removal process 5 may performed in any order. The decarbonation process 4 may precede the coarse contaminant particles removal process 5, or the coarse contaminant particles removal process 5 may precede the decarbonation process 4, as shown in FIG. 1 and so on.

Following the decarbonation process 4 and coarse contaminant particles removal process 5, the micro-particles containing MAP precipitated in the digestion tank and during the decarbonation process are separated from the digested sludge. A liquid cyclone, a centrifugal settler, a sedimentation tank employing gravity separation, and so on may be employed as a method of separating the micro-particles from the digested sludge using the specific gravity difference between the two, while a vibrating screen, a drum screen, a filter layer, a classification layer-type separation tank, and so on may be employed as a micro-particle separation method using differences in particle diameter.

A liquid cyclone has a reverse conical-form lower portion structure, and is constituted by a liquid cyclone inflow pipe, a micro-particle discharge pipe, and a sludge discharge pipe. In the liquid cyclone, the digested sludge containing MAP is caused to swirl down the wall surface of the reverse conical form by the pressure of an extractor pump. The MAP-containing micro-particles, which have a greater specific gravity than the digested sludge, are collected and concentrated on a lower wall surface side by means of centrifugal force. The concentrated micro-particles are extracted either continuously or intermittently.

In the present invention, coarse contaminant particles are separated before the MAP-containing micro-particle separation process 7, and therefore problems such as blockages of the liquid cyclone caused by coarse contaminant particles and the like are solved. Having passed through the decarbonation process 4, coarse contaminant particles separation process 5, and micro-particle separation process 7, the digested sludge is transported through a sewer to a collective sludge treatment facility, other type of sludge treatment facility, or a sludge treatment facility within the same premises. As a result of the processes described above, the magnesium ion concentration of the digested sludge is greatly reduced and MAP micro-particles are removed from the digested sludge. Hence, according to the present invention, the MAP generation ability is reduced even upon pH variation or gas phase intermixing, and therefore MAP scale generation is reduced greatly.

Figure 2:
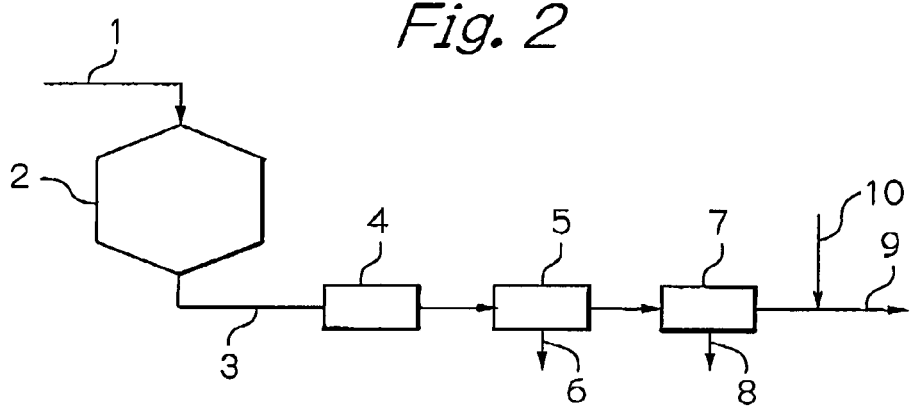
FIG. 2 is a flow diagram showing another example of the flow of digested sludge treatment according to the present invention.

In the example shown in FIG. 2, processing to lower the pH and/or processing to reduce at least one of the magnesium ion concentration, phosphate ion concentration, and ammonium ion concentration are performed following the micro-particle separation process 7. A pH adjustor may be added as a method of reducing the pH. A chemical for lowering the pH of digested sludge, such as hydrochloric acid, sulfuric acid, aluminum salt, or iron salt, is used as the pH adjustor. With aluminum salt and iron salt, the soluble phosphorus contained in the digested sludge is fixed, causing a reduction in the solubility concentration. Ammonia stripping, fixation by adhesive, and so on may be used as a method of reducing ammonium ions. MAP is precipitated when any of the phosphorus concentration, magnesium concentration, ammonium concentration, and pH rises. Conversely, as described above, when the pH of the digested sludge falls or at least one of the magnesium ion concentration, phosphate ion concentration, and ammonium ion concentration is reduced, the MAP generation ability deteriorates. According to the present invention, the MAP generation ability deteriorates, reducing the likelihood of MAP scale generation. Note that with the addition of iron salt, the generation of hydrogen sulfide and the like from the digested sludge can be suppressed.

Figure 3:
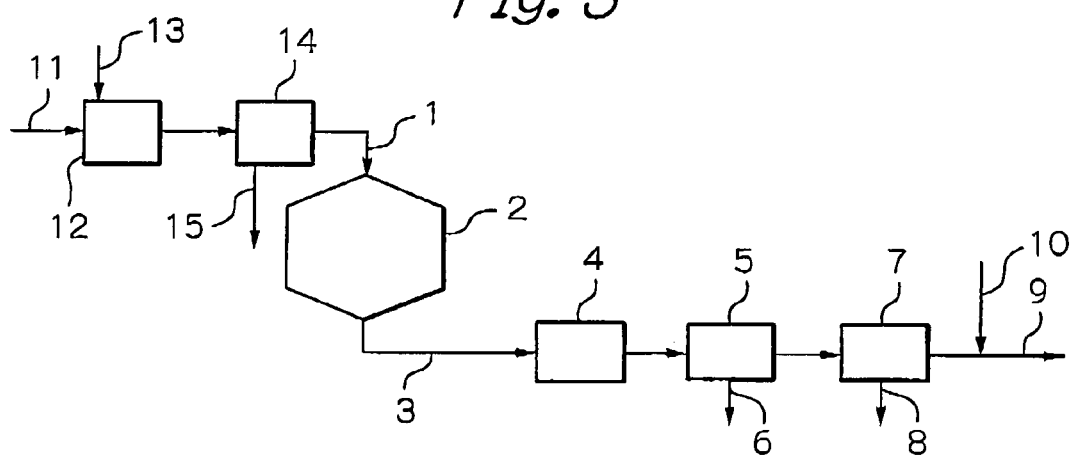
FIG. 3 is a flow diagram showing another example of the flow of digested sludge treatment according to the present invention.

In the example shown in FIG. 3, excess sludge or concentrated excess sludge 11 is introduced into a phosphorus discharge tank 12. Phosphorus is discharged from the sludge by adding a BOD under anaerobic conditions. A BOD source 13 uses organic waste matter containing raw sludge, a portion of the solubilized sludge that is generated when sludge solubilization treatment is performed, or a portion of the organic waste water from which the excess sludge is generated. A chemical such as methanol may be added as a separate BOD source. In the phosphorus discharge tank 12, phosphorus is discharged from the excess sludge and concentrated excess sludge, and a part of the magnesium contained in the sludge is also eluted to the liquid side. Particularly when a biological dephosphorylation method such as an anaerobic/aerobic process is performed in a water treatment system, the phosphorus concentration and magnesium concentration of the liquid increase dramatically. When phosphorus is discharged from concentrated excess sludge, the phosphorus concentration and magnesium concentration of the liquid fall to approximately 50 to 400 mg/L and 50 to 200 mg/L, respectively. Meanwhile, ammonium elution is small, leading to an ammonium concentration of approximately 50 to 150 mg/L. Having undergone this phosphorus discharge treatment, the discharged sludge is separated into concentrated sludge 1 and concentrated sludge liquor 15 in a sludge concentration apparatus 14, or separated into sludge cake and sludge liquor in a dewatering apparatus. The sludge concentration apparatus 14 employs a method such as flotation separation, gravity separation, or mechanical separation. The dewatering apparatus employs a dewatering method such as centrifugal dewatering, belt pressing, or screw pressing.

The separated liquid and sludge liquor 15 contain concentrated phosphorus, and it is of course desirable that the phosphorus be removed and recovered by precipitating a phosphorus compound from this waste water. In the anaerobic digestion tank 2, the sludge is broken down such that the phosphorus, magnesium, and ammonium migrate to the liquid side, but by discharging the phosphorus and magnesium from the sludge in advance, before introduction into the anaerobic digestion tank, such that the phosphorus and magnesium concentrations decrease, as in the present invention, the amount of MAP that is generated spontaneously in the anaerobic digestion tank can be reduced. As a result, scale trouble caused by MAP and the like can be suppressed. Moreover, the amount of MAP that is discharged together with the digested sludge can be reduced. In FIG. 3, the digested sludge is decarbonated, coarse contaminant particles are removed, and the MAP-containing micro-particles are separated. The effects of these processes are as described above.

Figure 6:
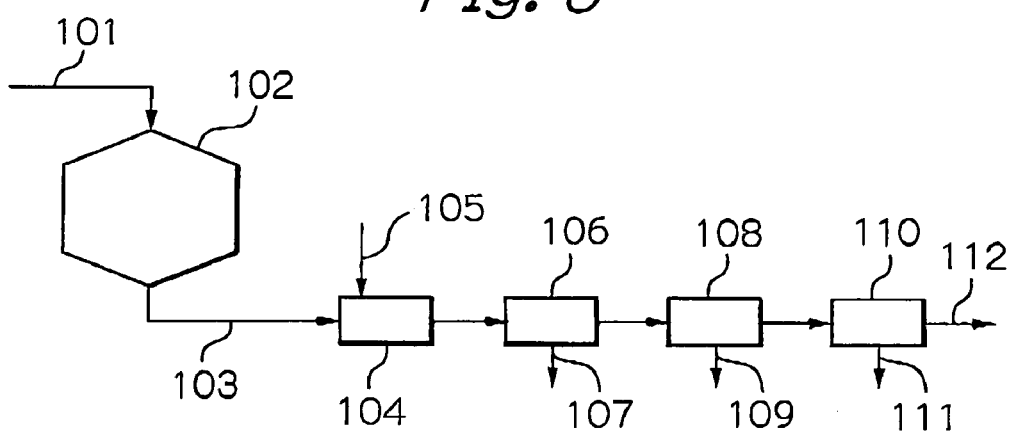
FIG. 6 is a flow diagram showing another example of the flow of digested sludge treatment according to the present invention.

Another example of the treatment flow according to the present invention is illustrated in FIG. 6. The flow in FIG. 6 is constituted by an anaerobic digestion tank 102, a crystallization process 104, a coarse contaminant particles removal process 106, a micro-particle separation process 108, and a dewatering process 110. Note that in the flow illustrated in FIG. 6 and the following FIGS. 7 and 8, the dewatering process 110 is not essential, and may be omitted.

Excess sludge and/or primary sludge 101 are introduced into the anaerobic digestion tank 102. The interior of the anaerobic digestion tank is heated and maintained at a temperature of approximately 55° C. or approximately 35° C. In the anaerobic digestion tank, the sludge is broken down into methane, carbon dioxide, a gas such as hydrogen sulfide, water-soluble nitrogen, phosphorus, and so on by the action of acid-fermentative bacteria and methanogenic bacteria. The generated methane gas may be recovered and used as energy. The amount of generated methane is increased by introducing easily decomposable raw sludge in addition to the excess sludge. As the sludge decomposes, phosphorus, magnesium, and ammonium migrate to the liquid side. When the respective ion concentrations thereof reach or exceed the MAP solubility product, MAP is generated spontaneously in the anaerobic digestion tank. As a result of this MAP precipitation, scale trouble occurs on the draft tube, the base portion of the anaerobic digestion tank, the sludge discharge pipe, and so on.

Normally, the ratio of the phosphorus, magnesium, and ammonium in the digested sludge is generally phosphorus: magnesium:ammonium=100 to 500: several to several tens: 1000. The magnesium concentration is overwhelmingly lower than the phosphorus and ammonium concentrations, and therefore during MAP generation in the digestion tank, the magnesium concentration clearly serves as a rate control.

In the following crystallization process 104, MAP is precipitated by adding a magnesium compound to the digested sludge and digested sludge liquor extracted from the anaerobic digestion tank 102. If aeration decompression, or the like is also performed at this time, the sludge is decarbonated, leading to an increase in the pH, and hence MAP can be precipitated more efficiently. Needless to say, a chemical such as sodium hydroxide, magnesium hydroxide, or magnesium oxide may be added to raise the pH. As the added magnesium compound, magnesium chloride, magnesium hydroxide, magnesium oxide, sea water, and so on may be used. As regards the amount of added magnesium, a molar ratio between 0.1 and 10, preferably between 0.5 and 3.0, and more preferably between 0.8 and 1.2 in relation to the aqueous orthophosphoric acid concentration of the digested sludge is suitable. The pH in the reaction should be between 7.0 and 11.0, and preferably between 7.5 and 8.5.

Seed crystals are preferably added to the crystallization process 104 to ensure that MAP is generated efficiently. The MAP that precipitates spontaneously in the digestion tank, the MAP that precipitates in the crystallization process 104, or MAP precipitated in a separate reactor may be used as the seed crystals.

Figure 7:
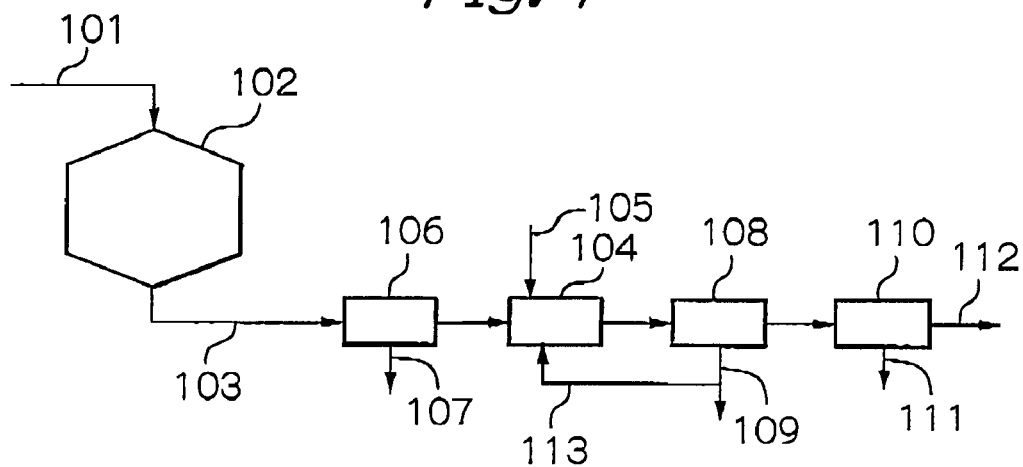
FIG. 7 is a flow diagram showing another example of the flow of digested sludge treatment according to the present invention.
Figure 8:
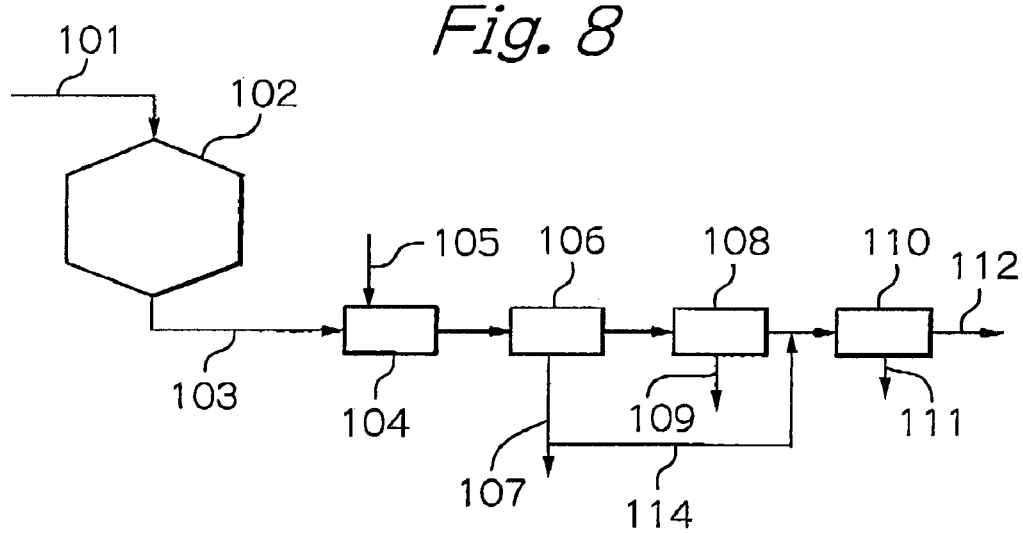
FIG. 8 is a flow diagram showing another example of the flow of digested sludge treatment according to the present invention.

As shown in another flow diagram of the present invention in FIG. 7, MAP-containing micro-particles and so on recovered in the separation process 108 may be supplied to the crystallization process 104 through a pipe 113 and used as seed crystals. Separated water generated midway through the separation process or MAP contained in effluent or the like may also be used.

Alternatively, a powder or granular substance such as rock phosphate, dolomite, bone charcoal, activated carbon, silica sand, or calcium silicate may be used as seed crystals. The particle diameter of the seed crystals is arbitrary, but is preferably set between 0.05 and 3.0 mm, and more preferably between 0.1 and 0.5 mm. By precipitating new MAP on the surface of the seed crystals, separation of the digested sludge and MAP in the subsequent separation process can be performed favorably. The seed crystal charging amount is extremely important for precipitating MAP on the surface of the seed crystals. The charging amount is determined in consideration of the introduced phosphorus amount and the seed crystal particle diameter such that the phosphorus introduction amount in relation to the seed crystal surface area (the phosphorus surface area load hereafter) is no more than 100 $g\text{-}P/m^2/d$, preferably no more than 30 $g\text{-}P/m^2/d$, and more preferably no more than 10 $g\text{-}P/m^2/d$.

Next, the digested sludge is introduced into the coarse contaminant particles removal process 106. Conventionally, no coarse contaminant particles separation process is performed, and therefore when a liquid cyclone is used in the subsequent micro-particle separation process, blockages caused by coarse contaminant particles and so on occur. For this reason, there is demand for a treatment method exhibiting long-term stability. In the present invention, coarse contaminant particles are removed, enabling a vast improvement in the stability of the subsequent micro-particle separation process 108, particularly when this process employs a liquid cyclone. Furthermore, when a sedimentation tank is used, the coarse contaminant particles, digested sludge, and MAP are mixed together, and hence in the past it has been impossible to obtain MAP having a high degree of purity. In the present invention, MAP with a high degree of purity can be obtained by separating the coarse contaminant particles in advance. The separated coarse contaminant particles may be discharged outside of the system or introduced into the dewatering process 110 through a pipe 114, as shown in another flow diagram of the present invention in FIG. 8. In this case, the dewatering performance is enhanced, and hence the coarse contaminant particles 6 are preferably introduced into the dewatering process. The crystallization process 104 and coarse contaminant particles separation process 106 may performed in any order. The crystallization process 104 may precede the coarse contaminant particles separation process 106, as shown in FIG. 6, or the coarse contaminant particles separation process 106 may precede the crystallization process 104, as shown in FIG. 7.

Following the crystallization process 104 and coarse contaminant particles removal process 106, the micro-particles containing MAP precipitated in the digestion tank and during the crystallization process are separated from the digested sludge. A liquid cyclone, a centrifugal settler, a sedimentation tank employing gravity separation, and so on may be employed as a method of separating the micro-particles from the digested sludge using the specific gravity difference between the two, while a vibrating screen, a drum screen, a filter layer, a classification layer-type separation layer, and so on may be employed as a micro-particle separation method using differences in particle diameter. The digested sludge is viscous, making it difficult to separate the MAP from the digested sludge through natural sedimentation, and therefore a mechanical separation method using a liquid cyclone or the like is preferable. A liquid cyclone has a reverse conical-form lower portion structure, and is constituted by a liquid cyclone inflow pipe, a micro-particle discharge pipe, and a sludge discharge pipe. In the liquid cyclone, the digested sludge containing MAP is caused to swirl down the wall surface of the reverse conical form by the pressure of an extractor pump. The MAP-containing micro-particles, which have a greater specific gravity than the digested sludge, are collected and concentrated on a lower wall surface side by means of centrifugal force. The concentrated micro-particles are extracted either continuously or intermittently.

In the present invention, coarse contaminant particles such as night soil residue are separated before the MAP-containing micro-particle separation process 108, and therefore problems such as blockages of the liquid cyclone caused by coarse contaminant particles and the like are solved.

In the dewatering process 110, the digested sludge separated from the MAP-containing micro-particles is dewatered. Belt pressing, screw pressing filter pressing, centrifugal dewatering, and so on may be used as a dewatering method. As noted above, by introducing the coarse contaminant particles separated in the coarse contaminant particles separation process 106 into the dewatering process 110, the dewatering effect can be improved, and hence this is preferable.

To prevent pipe blockages caused by MAP scale following this process, processing to lower the pH and/or processing to reduce at least one of the magnesium ion concentration, phosphate ion concentration, and ammonium ion concentration are preferably performed following the micro-particle separation process 108. A pH adjustor may be added as a method of reducing the pH. A chemical for lowering the pH of digested sludge, such as hydrochloric acid, sulfuric acid, aluminum salt, or iron salt, is used as the pH adjustor. With aluminum salt and iron salt, the soluble phosphorus contained in the digested sludge is fixed, causing a reduction in the solubility concentration.

Ammonia stripping, fixation by adhesive, and so on may be used as a method of reducing ammonium ions. MAP is precipitated when any of the phosphorus concentration magnesium concentration, ammonium concentration, and pH rises. Conversely, as described above, when the pH of the digested sludge falls or at least one of the magnesium ion concentration, phosphate ion concentration, and ammonium ion concentration is reduced, the MAP generation ability deteriorates. According to the present invention, the MAP generation ability deteriorates, reducing the likelihood of MAP scale generation. Note that with the addition of iron salt, the generation of hydrogen sulfide and the like from the digested sludge can be suppressed. Needless to say, each of the above processes may be performed in the same treatment facility, or the sludge may be piped to a different treatment facility for each process.

By means of the above processes, phosphorus can be recovered efficiently from the digested sludge. In the past, it has been particularly difficult to recover MAP generated spontaneously in a digestion tank, but with the present system, MAP can be recovered easily.

EXAMPLES

The present invention will now be described in further detail using examples.

Example 1

In this example, treatment was performed using a treatment flow such as that shown in FIG. 1. The excess sludge of an anaerobic/aerobic process was used as the subject organic waste matter. The treatment flow was constituted by an anaerobic digestion tank, an aeration tank serving as a decarbonation tank, a coarse contaminant particles separation process, and a micro-particle separation process. The amount of sludge introduced into the anaerobic digestion tank was set at 90 L/d. Digestion took place over twenty days at a digestion temperature of 35° C. Approximately 90 L/d of digested sludge was discharged from the digestion tank as extracted sludge. The extracted sludge was aerated to raise the pH. Aeration took place over two hours at an air intake rate of 40 L/min. In the coarse contaminant particles separation process, coarse contaminant particles were removed using a vibrating screen with an aperture of 2.0 mm. Following decarbonation and coarse contaminant particles removal, the digested sludge was separated into digested sludge and MAP-containing micro-particles using a 4-inch liquid cyclone.

Note that the decarbonation process, coarse contaminant particles separation process, and micro-particle separation process were performed as semibatch operations. The water quality in each process is shown in Table 1.

The sludge introduced to anaerobic digestion (introduced sludge hereafter) contained 42 g/L of TS, 35 g/L of VS, and 920 mg/L of T-P. Following extraction from the anaerobic digestion tank, the sludge (extracted sludge hereafter) had a pH of 7.2, and contained 21 g/L of TS, 17 g/L of VS, 920 mg/L of T-P, 300 mg/L of soluble $PO_4$-P, and 15 mg/L of soluble magnesium.

Following aeration of the extracted sludge to raise the pH to 8.2, the soluble magnesium concentration was measured and found to have decreased to 3 mg/L. The amount of MAP-containing micro-particles recovered in the micro-particle separation process was 1.9 g/L, of which 1.5 g/L was MAP.

After undergoing this treatment, a simulation was conducted in which the digested sludge was transferred continuously into a stainless steel pipe having an inner diameter of 130 mm. The sludge was retained in the pipe for 15 days. After approximately three months, no scale-like crystals could be found in the pipe. The amount of scale that had become adhered to a test piece provided in advance was only 2 g. Hence, it may be determined that by performing the treatment described above, it was possible to prevent scale generation.

The water quality in each process is shown in Table 2.

The sludge introduced to anaerobic digestion (introduced sludge hereafter) contained 42 g/L of TS, 35 g/L of VS, and 920 mg/L of T-P. Following extraction from the anaerobic digestion tank, the sludge (extracted sludge hereafter) had a pH of 7.2, and contained 21 g/L of TS, 17 g/L of VS, 920 mg/L of T-P, 300 mg/L of soluble $PO_4$-P, and 15 mg/L of soluble magnesium.

Following decompression of the extracted sludge to raise the pH to 8.2, the soluble magnesium concentration was measured and found to have decreased to 3 mg/L. The amount of MAP-containing micro-particles recovered in the micro-particle separation process was 1.9 g/L, of which 1.5 g/L was MAP.

After undergoing this treatment, a simulation was conducted in which the digested sludge was transferred continuously into a stainless steel pipe having an inner diameter of 130 mm. The sludge was retained in the pipe for 15 days. After approximately three months, no scale-like crystals could be found in the pipe. The amount of scale that had become adhered to a test piece provided in advance was only 2 g. Hence, it may be determined that by performing the treatment described above, it was possible to prevent scale generation.

TABLE 1

| | INTRODUCED SLUDGE | EXTRACTED SLUDGE | DECARBONATED DIGESTED SLUDGE | DIGESTED SLUDGE FOLLOWING MICRO-PARTICLE SEPARATION |
|---|---|---|---|---|
| PH(-) | — | 7.2 | 8.5 | 8.5 |
| TS (g/L) | 42 | 21 | 21 | 19 |
| VS (g/L) | 35 | 17 | 17 | 17 |
| T-P (mg/L) | 920 | 920 | 920 | 720 |
| PO4-P (mg/L) | — | 300 | 280 | 280 |
| Mg (mg/L) | — | 15 | 2 | 2 |
| AMOUNT OF RECOVERED MICRO-PARTICLES (g/L) | — | — | — | 1.9 |

TABLE 2

| | INTRODUCED SLUDGE | EXTRACTED SLUDGE | DECARBONATED DIGESTED SLUDGE | DIGESTED SLUDGE FOLLOWING MICRO-PARTICLE SEPARATION |
|---|---|---|---|---|
| PH(-) | — | 7.2 | 8.2 | 8.2 |
| TS (g/L) | 42 | 21 | 21 | 19 |
| VS (g/L) | 35 | 17 | 17 | 17 |
| T-P (mg/L) | 920 | 920 | 920 | 720 |
| PO4-P (mg/L) | — | 300 | 280 | 280 |
| Mg (mg/L) | — | 15 | 3 | 3 |
| AMOUNT OF RECOVERED MICRO-PARTICLES (g/L) | — | — | — | 1.9 |

Example 2

In this example, treatment was performed using a treatment flow such as that shown in FIG. 1. The excess sludge of an anaerobic/aerobic process was used as the subject organic waste matter. The treatment flow was constituted by an anaerobic digestion tank, decompression treatment serving as a decarbonation tank, a coarse contaminant particles separation process, and a micro-particle separation process. The amount of sludge introduced into the anaerobic digestion tank was set at 90 L/d. Digestion took place over twenty days at a digestion temperature of 35° C. Approximately 90 L/d of digested sludge was discharged from the digestion tank as extracted sludge.

The extracted sludge was decompressed to raise the pH. The degree of vacuum was set at −94 kPa, and the rotation speed of the rotary body was set at 1650 rpm.

In the coarse contaminant particles separation process, coarse contaminant particles were removed using a vibrating screen with an aperture of 2.0 mm. Following decarbonation and coarse contaminant particle removal, the digested sludge was separated into digested sludge and MAP-containing micro-particles using a 4-inch liquid cyclone.

Note that the decarbonation process, coarse contaminant particles separation process, and micro-particle separation process were performed as semibatch operations.

Example 3

Figure 4:
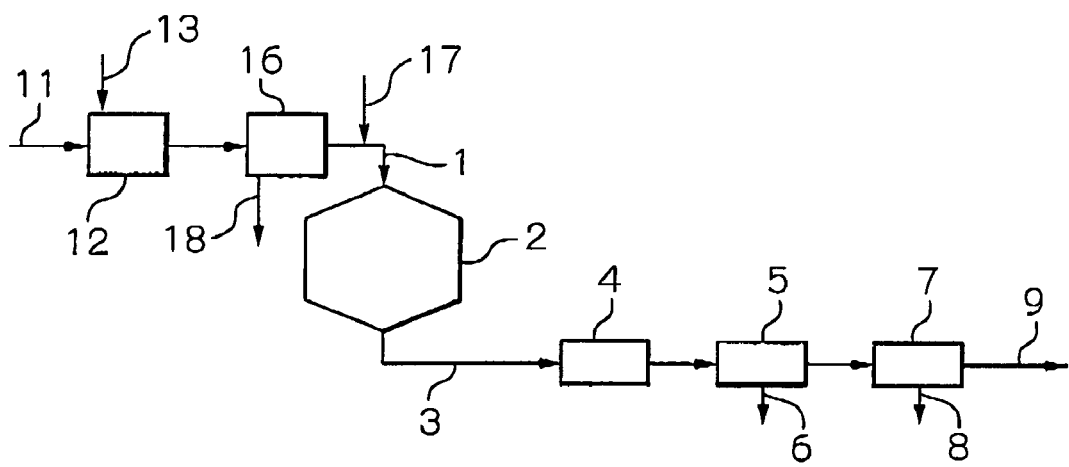
FIG. 4 is a flow diagram showing the flow of treatment used in a third example.

In this example, treatment was performed using a treatment flow such as that shown in FIG. 4. The excess sludge of an anaerobic/aerobic process was used as the subject organic waste matter. The treatment flow was constituted by a phosphorus discharge tank, a dewatering process, a concentration adjustment process, an anaerobic digestion tank, a decarbonation tank (aeration tank), a coarse contaminant particles separation process, and a micro-particle separation process. The excess sludge was retained in the phosphorus discharge tank for one day. The anaerobic digestion tank, decarbonation tank (aeration tank), coarse contaminant particles separation process, and micro-particle separation process were performed similarly to those of the first example. The water quality in each process is shown in Table 3.

The concentrated excess sludge contained 42 g/L of TS, 35 g/L of VS, 920 mg/L of T-P, 20 mg/L of $PO_4$—P, and 10 mg/L of soluble Mg. At the outlet of the phosphorus discharge process, the soluble $PO_4$-P and Mg had increased to 300 mg/L and 100 mg/L, respectively. Following phosphorus discharge, the concentrated excess sludge was dewatered, whereupon the TS of the sludge was adjusted to 42 g/L using secondary waste water effluent. Following this adjustment, the sludge contained 42 g/L of TS, 35 g/L of VS, 600 mg/L of T-P, 60 mg/L of $PO_4$-P, and 20 mg/L of soluble Mg.

The extracted sludge contained 20 g/L of TS, 17 g/L of VS, 600 mg/L of T-P, 180 mg/L of PO$_4$-P, and 20 mg/L of soluble Mg. Following aeration of the extracted sludge to raise the pH to 8.2, the soluble magnesium concentration was measured and found to have decreased to 3 mg/L.

The amount of MAP-containing micro-particles recovered in the micro-particle separation process was 0.3 g/L, of which 0.25 g/L was MAP.

After undergoing this treatment, a simulation was conducted in which the digested sludge was transferred continuously into a stainless steel pipe having an inner diameter of 130 mm. The sludge was retained in the pipe for 15 days. After approximately three months, no scale-like crystals could be found in the pipe. The amount of scale that had become adhered to a test piece provided in advance was only 2g. Hence, it may be determined that by performing the treatment described above, it was possible to prevent scale generation.

TABLE 3

| | CONCENTRATED EXCESS SLUDGE | PHOSPHORUS DISCHARGE TANK OUTLET | INTRODUCED SLUDGE (FOLLOWING TS CONCENTRATION ADJUSTMENT) |
|---|---|---|---|
| PH(-) | — | — | — |
| TS (g/L) | 42 | 38 | 42 |
| VS (g/L) | 35 | 31 | 35 |
| T-P (mg/L) | 920 | 830 | 600 |
| PO4-P (mg/L) | 20 | 300 | 60 |
| Mg (mg/L) | 10 | 100 | 20 |
| AMOUNT OF RECOVERED MICRO-PARTICLES (g/L) | — | — | — |

| | EXTRACTED SLUDGE | DECARBONATED DIGESTED SLUDGE | DIGESTED SLUDGE FOLLOWING MICRO-PARTICLE SEPARATION |
|---|---|---|---|
| PH(-) | 7.2 | 8.2 | 8.2 |
| TS (g/L) | 20 | 20 | 19 |
| VS (g/L) | 17 | 17 | 17 |
| T-P (mg/L) | 600 | 600 | 560 |
| PO4-P (mg/L) | 180 | 160 | 160 |
| Mg (mg/L) | 20 | 3 | 3 |
| AMOUNT OF RECOVERED MICRO-PARTICLES (g/L) | — | — | 0.3 |

Comparative Example 1

Figure 5:
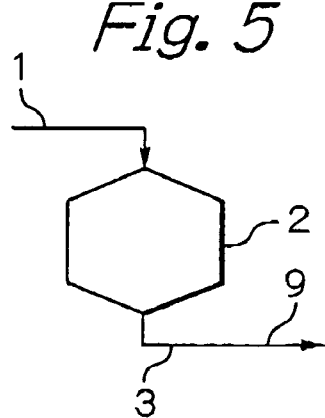
FIG. 5 is a flow diagram showing the flow of treatment used in a first comparative example.

In the following, the results of a comparison with the first example will be illustrated. As shown in FIG. 5, the first comparative example is identical to the first example except that the decarbonation process, coarse contaminant particles separation process, and micro-particle separation process have been omitted. The water quality in each process is shown in Table 4.

The introduced sludge contained 42 g/L of TS, 35 g/L of VS, and 920 mg/L of T-P. The extracted sludge contained 21 g/L of TS, 17 g/L of VS, 920 mg/L of T-P, 300 mg/L of PO$_4$-P, and 9 mg/L of soluble magnesium. After undergoing this treatment, a simulation was conducted in which the digested sludge was transferred continuously into a stainless steel pipe having an inner diameter of 130 mm. The sludge was retained in the pipe for 15 days. After approximately three months, scale having a thickness of approximately 3 mm had formed on the wall surface of the pipe. The scale was subjected to component analysis using an X-ray diffraction apparatus and a fluorescent X-ray apparatus, in which the scale was found to be MAP. It is believed that the MAP was generated due to MAP accumulation in the digested sludge and pH variation caused by decarbonation and the like in the pipe.

TABLE 4

| | INTRODUCED SLUDGE | EXTRACTED SLUDGE |
|---|---|---|
| PH(-) | — | 7.2 |
| TS (g/L) | 42 | 21 |
| VS (g/L) | 35 | 17 |
| T-P (mg/L) | 920 | 920 |
| PO4-P (mg/L) | — | 300 |
| Mg (mg/L) | — | 9 |
| AMOUNT OF RECOVERED MICRO-PARTICLES (g/L) | — | — |

Example 4

In this example, treatment was performed using a treatment flow such as that shown in FIG. 6. The excess sludge of an anaerobic/aerobic process was used as the subject organic waste matter.

The treatment flow was constituted by an anaerobic digestion tank, a crystallization tank, a coarse contaminant particles separation process, and a micro-particle separation process. The amount of sludge introduced into the anaerobic digestion tank was set at 90 L/d. Digestion took place over twenty days at a digestion temperature of 35° C. Approximately 90 L/d of digested sludge was discharged from the digestion tank as extracted sludge. Magnesium chloride was added to the crystallization tank at an Mg/P molar ratio of 1 in relation to the orthophosphoric acid ion concentration of the digested sludge, and a pH adjustor was added to adjust the pH to 8.0. Further, 7 kg of the MAP-containing micro-particles recovered in the micro-particle separation process was added as seed crystals.

A vibrating screen with an aperture of 2.0 mm was used in the coarse contaminant particles separation process.

A 4-inch liquid cyclone was used in the micro-particle separation process.

Note that all processes other than the anaerobic digestion tank were performed as semibatch operations.

The water quality in each process is shown in Table 5.

The sludge introduced to anaerobic digestion (introduced sludge) contained 42 g/L of TS, 35 g/L of VS, and 920 mg/L of T-P. Following extraction from the anaerobic digestion tank, the sludge (extracted sludge: digested sludge) had a pH of 7.2, and contained 21 g/L of TS, 17 g/L of VS, 920 mg/L of T-P, and 300 mg/L of soluble PO$_4$-P. The sludge discharged from the crystallization tank had a pH of 8.0, and contained 24 g/L of TS, 17 g/L of VS, 920 mg/L of T-P, and 10 mg/L of soluble PO$_4$-P. The amount of MAP-containing micro-particles recovered in the micro-particle separation process was 4.3 g per liter of digested sludge, of which 4.0 g was MAP. The discharged sludge had a pH of 8.0, and contained 19 g/L of TS, 17 g/L of VS, 440 mg/L of T-P, and 10 mg/L of soluble PO$_4$-P. Of the 920 mg/L phosphorus concentration introduced into the digested sludge, 480 mg/L was recovered.

TABLE 5

|  | INTRODUCED SLUDGE | EXTRACTED SLUDGE | SLUDGE DISCHARGED FROM CRYSTALLIZATION TANK | SLUDGE DISCHARGED FROM MICRO-PARTICLE SEPARATION PROCESS |
|---|---|---|---|---|
| PH(-) | — | 7.2 | 8 | 8 |
| TS (g/L) | 42 | 21 | 24 | 19 |
| VS (g/L) | 35 | 17 | 17 | 17 |
| T-P (mg/L) | 920 | 920 | 920 | 440 |
| PO4-P (mg/L) | — | 300 | 10 | 10 |
| AMOUNT OF RECOVERED MICRO-PARTICLES (g/L) | — | — | — | 4.3 |

Comparative Example 2

Figure 9:
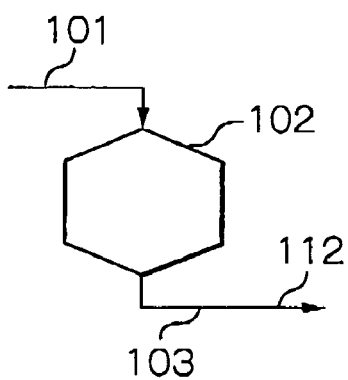
FIG. 9 is a flow diagram of an apparatus used in a second comparative example.

In the following, the results of a comparison with the fourth example will be illustrated. As shown in FIG. 9, the second comparative example is identical to the fourth example except that the crystallization process, coarse contaminant particles separation process, and micro-particle separation process have been omitted The water quality in each process is shown in Table 6.

TABLE 6

|  | INTRODUCED SLUDGE | EXTRACTED SLUDGE |
|---|---|---|
| PH(-) | — | 7.2 |
| TS (g/L) | 42 | 21 |
| VS (g/L) | 35 | 17 |
| T-P (mg/L) | 920 | 920 |
| PO4-P (mg/L) | — | 300 |
| AMOUNT OF RECOVERED MICRO-PARTICLES (g/L) | — | — |

The introduced sludge contained 42 g/L of TS, 35 g/L of VS, and 920 mg/L of T-P. The extracted sludge contained 21 g/L of TS, 17 g/L of VS, 920 mg/L of T-P, and 300 mg/L of $PO_4$-P. The extracted sludge also contained 1.5 g/L of MAP. The MAP in the extracted sludge was not recovered, but dewatered and then incinerated.

The amount of recovered phosphorus in the comparative example described above was zero.

What is claimed is:

1. A digested sludge treatment apparatus for treating digested sludge generated by subjecting organic waste matter to digestion, comprising:
   an apparatus for decarbonating said digested sludge;
   a removal apparatus for removing coarse contaminant particles from said digested sludge; and
   an apparatus for separating or concentrating crystals containing magnesium ammonium phosphate from said digested sludge after said digested sludge passes through said decarbonation apparatus and said removal apparatus.

2. A digested sludge treatment apparatus for treating digested sludge generated by subjecting organic waste matter to anaerobic digestion, comprising:
   a crystallization reactor for precipitating magnesium ammonium phosphate from said digested sludge;
   a removal apparatus for removing coarse contaminant particles from said digested sludge; and
   an apparatus for separating or concentrating crystals containing magnesium ammonium phosphate from said digested sludge after said digested sludge passes through said crystallization reactor and said coarse contaminant particles removal apparatus.

* * * * *